United States Patent [19]
Chan et al.

[11] Patent Number: 5,385,515
[45] Date of Patent: Jan. 31, 1995

[54] START RATIO ENGAGEMENT CONTROL SYSTEM AND METHOD

[75] Inventors: Kwok W. Chan, Chorley; Michael Dobson, Leyland, both of England

[73] Assignee: Eaton Corporation, Cleveland, Ohio

[21] Appl. No.: 104,687

[22] Filed: Aug. 11, 1993

[30] Foreign Application Priority Data

Aug. 27, 1992 [GB] United Kingdom ............... 9218254

[51] Int. Cl.6 ............................................. F16H 61/08
[52] U.S. Cl. ......................................... 477/75; 477/78
[58] Field of Search ................ 477/75, 78, 122, 154

[56] References Cited

U.S. PATENT DOCUMENTS

| | | | |
|---|---|---|---|
| 3,876,028 | 4/1975 | Asano et al. | 180/70 R |
| 4,648,290 | 3/1987 | Dunkley et al. | 74/866 |
| 4,714,144 | 12/1987 | Speranza | 477/78 |
| 4,735,109 | 4/1988 | Richards et al. | 74/745 |
| 4,754,665 | 7/1988 | Vandervoort | 74/745 |
| 4,800,360 | 1/1989 | Dunkley et al. | 340/52 |
| 4,817,776 | 4/1989 | Tateno et al. | 477/75 |
| 4,873,637 | 10/1989 | Braun | 477/78 |
| 4,874,070 | 10/1989 | Nellums et al. | 477/78 |
| 4,899,857 | 2/1990 | Tateno et al. | 477/75 |
| 4,930,078 | 5/1990 | Dunkley et al. | 477/78 |
| 4,930,081 | 5/1990 | Dunkley et al. | 364/424.1 |
| 5,056,639 | 10/1991 | Petzold et al. | 477/78 |

FOREIGN PATENT DOCUMENTS

| | | |
|---|---|---|
| 0271617 | 6/1988 | European Pat. Off. . |
| 0328362 | 8/1989 | European Pat. Off. . |
| 2097074 | 10/1982 | United Kingdom . |

*Primary Examiner*—Dirk Wright
*Attorney, Agent, or Firm*—Howard D. Gordon

[57] ABSTRACT

A control system and method for a vehicular semi-automatic mechanical transmission system (10) is provided for allowing controller or operator request for a direct downshift into a preselected start ratio, under certain predefined conditions. The direct downshift into the preselected start gear ratio is sequenced such that the target synchronous engine speed (OS*GR) at target gear ratio engagement is substantially equal to a preselected desirable, preferably constant, value for all selectable start ratios.

20 Claims, 4 Drawing Sheets

START RATIO ENGAGEMENT CONTROL SYSTEM AND METHOD

BACKGROUND OF THE INVENTION

RELATED APPLICATIONS

The present application is related to patent applications Ser. No. 08/104,699, now still pending, titled SCROLLING GEAR RATIO SELECTION CONTROL SYSTEM AND METHOD; Ser. No. 08/104,698, now allowed, titled START RATIO SELECTION CONTROL SYSTEM AND METHOD; and Ser. No. 07/935,937, now still pending, titled START GEAR CONTROL SYSTEM AND METHOD, all assigned to the assignee of this application, Eaton Corporation, and all effectively filed the same day as this application, Aug. 11, 1993.

FIELD OF THE INVENTION

The present invention relates to an automatic or semi-automatic transmission system which, upon vehicle stopping, will cause or allow the transmission to be shifted directly into a preselected start ratio. In particular, the present invention relates to a control system/method for controlling the synchronous engine speed (which corresponds to transmission output shaft speed multiplied by the target gear ratio) at which a direct shift into the preselected start ratio will occur.

DESCRIPTION OF THE PRIOR ART

Fully automatic transmission systems, both for heavy-duty vehicles such as heavy-duty trucks and/or coaches, and for automobiles, that sense throttle openings or positions, vehicle speeds, engine speeds, and the like, and automatically shift the vehicle transmission in accordance therewith are well known in the prior art. Such fully automatic change gear transmissions include transmissions wherein pressurized fluid is utilized to frictionally engage one or more members to other members or to a ground to achieve a selected gear ratio and automated mechanical transmissions utilizing electronic, hydraulic and/or pneumatic logic and actuators to engage and disengage mechanical (i.e. positive) clutches to achieve a desired gear ratio. Examples of such transmissions may be seen by reference to U.S. Pat. Nos. 3,961,546; 4,081,065; 4,361,060; 5,050,079 and 5,109,729, the disclosures of which are hereby incorporated by reference.

Many vehicle operators like to control the selection of the gear ratios, particularly since they can see and/or know the nature of the road ahead and/or of the load being carried. Accordingly, semi-automatic mechanical transmission controls have been provided wherein automatic changing between a plurality of gear ratios is provided while normally permitting the driver to choose when to make a particular gear ratio change and whether to select the immediately consecutive ratio up or down or to skip one or more ratios. Examples of such a semi-automatic transmission control can be seen by reference to U.S. Pat. Nos. 4,648,290; 4,800,360; 4,930,081 and 4,930,078, the disclosures of which are incorporated herein by reference.

Both the automatic and semi-automatic prior art transmissions provide shifting into a preselected start ratio as the vehicle was braked to a stop. The preselected start ratio was typically fixed, variable by the operator or selected by the system controller in view of system operating parameters and predetermined logic rules. In the prior art transmission systems, a shift from the ratio engaged prior to braking into the preselected start ratio usually was initiated at a fixed output shaft/vehicle speed regardless of the target start ratio.

This is particularly a concern in modern mechanical transmissions for heavy-duty vehicles which may have 9, 10, 12, 13, 16 or 18 forward speed ratios and wherein any one of the first seven ratios may be appropriate start ratios under certain conditions. Examples of such multi-speed mechanical transmissions may be seen by reference to U.S. Pat. Nos. 4,735,109 and 4,754,665, the disclosures of which are incorporated herein by reference.

In such automated and semi-automated transmission controls, the gear reduction of the start ratios may range from about 11.00 to 1.00 to about 4.20 to 1.00 and thus the synchronous engine speeds, for engagement of the preselected start ratios, could vary by great amounts, which is deemed undesirable, especially to the vehicle operator.

SUMMARY OF THE INVENTION

In accordance with the present invention, the drawbacks of the prior art automatic and semi-automatic mechanical transmission control have been minimized or eliminated by the provision of a control and control method wherein engagement of the various selectable start from stop ratios are each sequenced to cause engagement of the target start ratio at a predetermined desirable synchronous engine speed.

For typical diesel engines utilized for heavy duty trucks, a synchronous engine speed of about 1000 RPM has proven to be desirable and pleasing to the vehicle operator.

The above is accomplished by determining the ratio of the currently preselected start gear ratio, and the expected vehicle speed decay during the shift into the target gear and then sequencing the initiation of the shift to achieve engagement at a vehicle speed which will result in the desired engine speed at full engagement in the target ratio.

Accordingly, it is an object of the present invention to provide a new and improved control system/method for semi-automatic mechanical transmission having a control for automatic shifting into a selected start ratio wherein the shifts into the selected start ratio are sequenced as a function of the ratio of the currently selected start ratio to achieve a predetermined engine speed at completion of engagement of the target ratio.

This and other objects and advantages of the present invention will become apparent from a reading of the following description of the preferred embodiments taken in connection with the attached drawings.

DESCRIPTION OF THE PREFERRED EMBODIMENT

Figure 1:
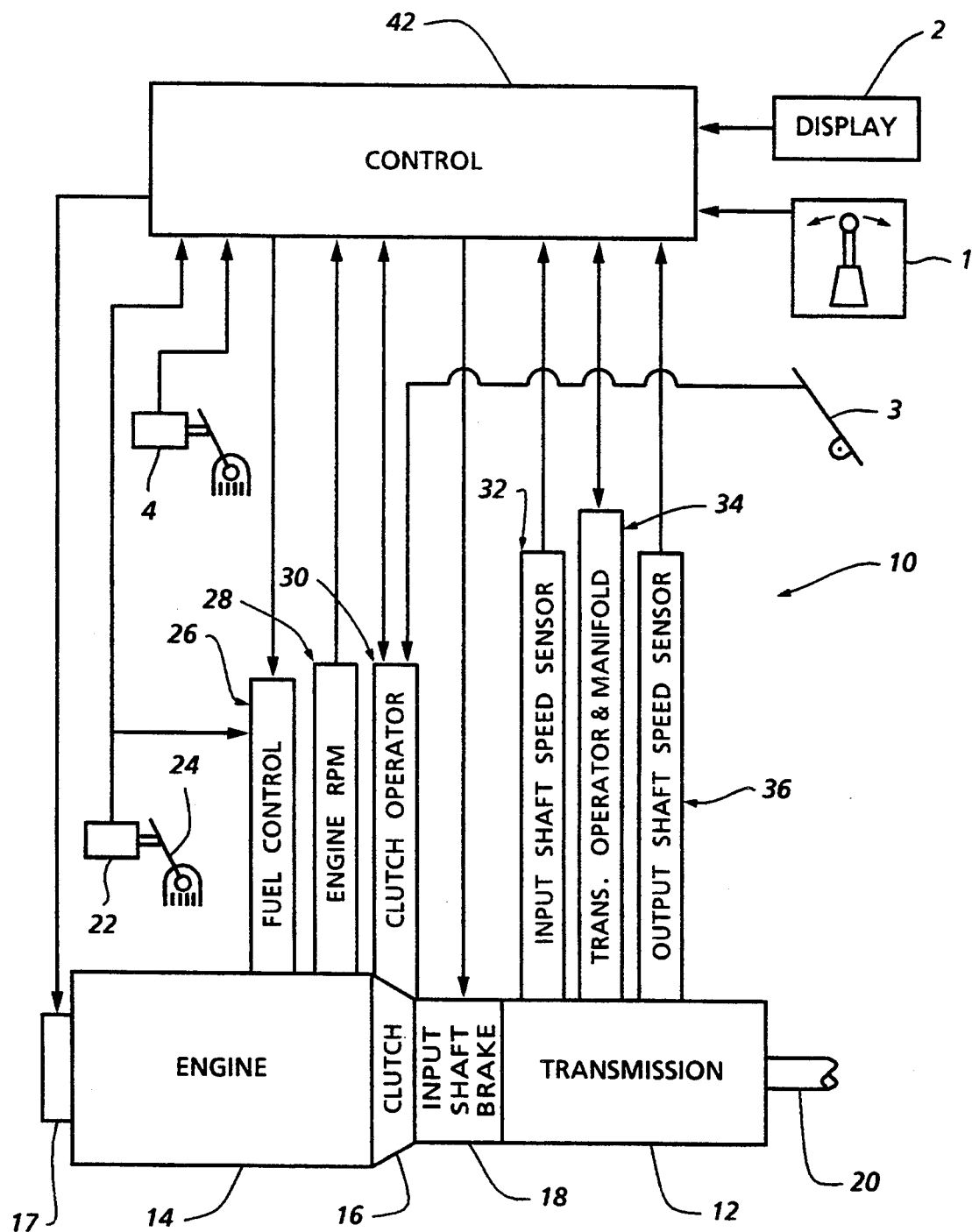
FIG. 1 is a schematic illustration of the semi-automatic mechanical change gear transmission system of the present invention.

In the present description of the preferred embodiment, certain terminology will be used for descriptive purposes only and is not intended to be limiting. The terms "upward", "downward", "rightward" and "leftward" will refer to directions in the drawings to which reference is made. The terms "inward" and "outward", refer to directions towards and away from, respectively, the geometric center of the device, or portion thereof, being described. The above applies to derivatives of the terms above specifically mentioned, and terms of similar import.

The term "simple transmission" is used to designate a change speed transmission, wherein the operator may select one of a plurality of single gear reductions. The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps for subdivisions of the gear ratio selected in the main transmission portion. In a splitter type compound transmission, the main transmission section is typically provided with relatively wide steps which are split or subdivided by the auxiliary section. The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

A "selected direction" of shifting will refer to selection of either single or multiple upshifting or downshifting from a particular gear ratio. The "displacement" between ratios refers to the number of selectable ratios between two given ratios, for example, third speed or gear ratio is displaced by one (1) and two (2) ratios, respectively, from fourth and fifth speed, respectively, in the downshift direction.

The term "blocked transmission" or "blocked transmission section" shall designate a change gear constant mesh transmission or transmission section, wherein a selected one of a plurality of axially moveable gears is nonrotatably coupled to a shaft as a result of axial movement of the selected gear from the neutral to the engaged position thereof, and by means of a resiliently biased positive clutch and a blocker is utilized to prevent such engagement until the members of the positive clutch are at substantially synchronous rotation, such synchronous condition achieved by manual and/or automatic manipulation of the transmission input and/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196 and 4,440,037, the disclosures of all of which are hereby incorporated by reference.

The present invention is applicable, in principle, to the semi-automatic control of any type of mechanical change gear transmission adaptable for providing output signals to and receiving command signals from electro-pneumatic control devices. However, the semi-automatic control system of the present invention is particularly advantageously applied to a splitter type compound transmission of the type having a non-synchronized, non-blocked main transmission section connected in series with an auxiliary section of the blocked splitter type. Such transmissions are known in the prior art and are referred to as "semi-blocked" transmissions, and are described and illustrated in European Patent Application No. 82303586.2, published Feb. 9, 1983 (EP-A-0071353) and European Patent Application No. 83307061.8, published Sep. 5, 1984 (EP-A-0117342) and U.S. Pat. No. 4,735,109. Transmissions of the type illustrated in above-mentioned U.S. Pat. No. 4,754,665 may be advantageous used in connection with the present invention.

The semi-automatic transmission system to which the present invention is particularly advantageously related, is described an illustrated in European Patent application 85305072.2, published Feb. 5, 1986 (EP-A-0 170 465) and U.S. Pat. No. 4,648,290.

Referring to FIG. 1, the position of a driver-operated throttle 24 is sensed at sensor 22 and fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that transmission output shaft speed is an indication of vehicle ground engine speed is an indication of transmission input shaft speed, and visa versa, especially if clutch 16 is nonslippingly engaged, while transmission output shaft speed is an indication of vehicle speed.

The throttle position sensor 24 may be of the type illustrated in U.S. Pat. No. 4,922,425, the disclosure of which is incorporated by reference, which will indicate the presence or absence of the operator's foot on the throttle pedal as well as displacement of the throttle pedal.

Devices, such as throttle position sensor assembly 22, for sensing the operators setting of a throttle pedal 24, or the like, and providing a signal proportional to, or at least indicative of, the monitored setting, and so called "remote fuel control" or "fly by wire" systems utilizing same, are known in the prior art and illustrated in the U.S. Pat. Nos. 4,250,845; 4,305,359; 4,319,658 and 4,461,254, the disclosures of which are hereby incorporated by reference.

For control of vehicle SAMT systems 10, such as the systems illustrated in above-mentioned U.S. Pat. Nos. 4,648,290; 4,551,802; 4,361,060 and 4,081,065, it is important to provide accurate input signals to central processing unit, or control, 38, indicative of the operator's positioning of the throttle. The setting is usually expressed as a percentage of wide-open or full throttle with the idle position being zero percent (0%) and full or maximum throttle being one hundred percent (100%).

To provide more responsive control of SAMT system 10, and/or to provide at least partial redundancy in the throttle position sensor assembly, two additional sensors, the "throttle pedal safety switch" and the "ride through detent switch" are provided.

The throttle pedal safety switch, provides a signal "THPS" which is indicative of the driver's foot on the throttle pedal and greater than engine idle speed fuel required. The ride through detent switch, provides an input signal indicative of a desire for maximum performance. This is often referred to as a "kick-down" signal.

Figure 2:
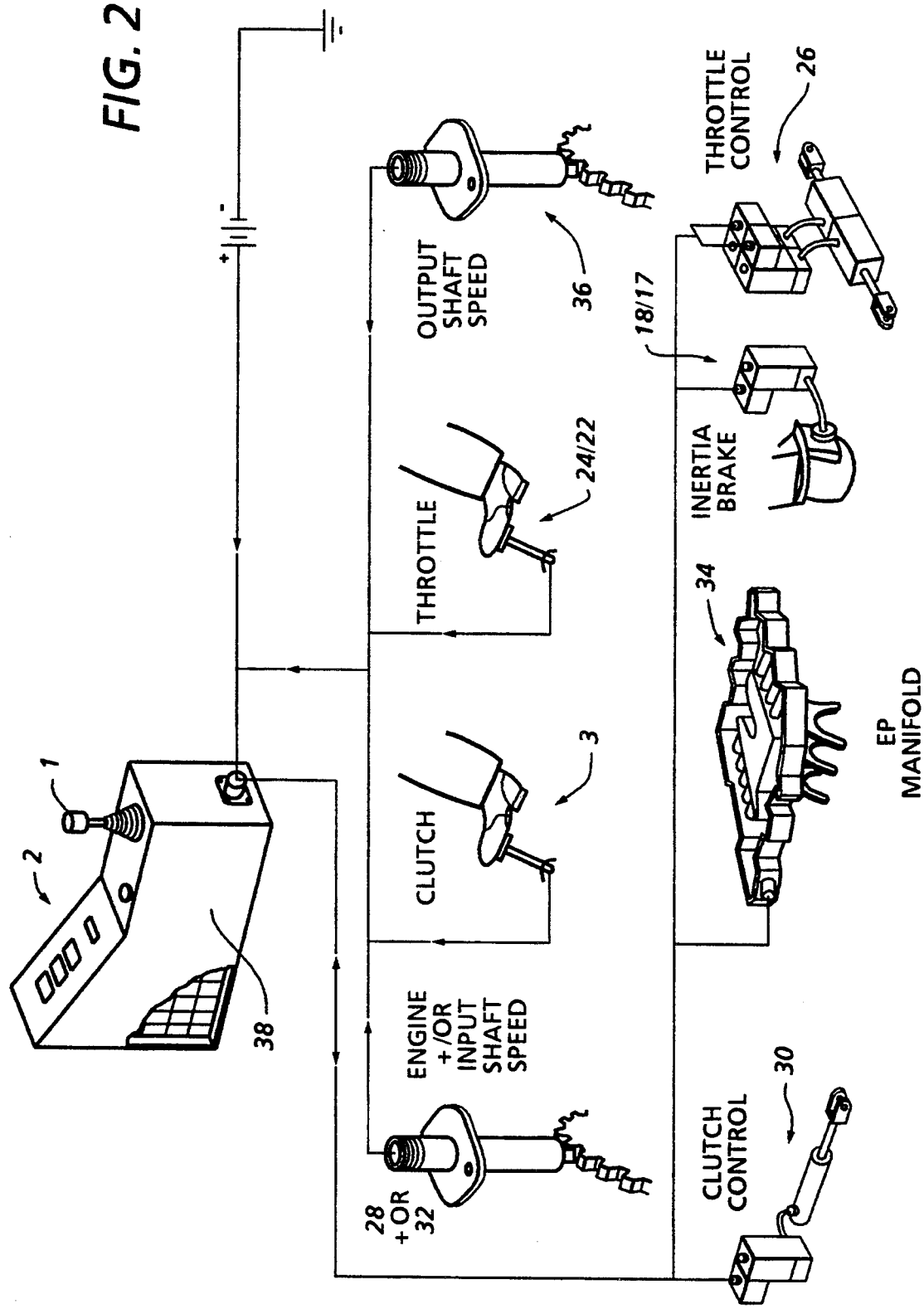
FIG. 2 is a schematic illustration of the control system of the semi-automatic transmission of the present invention.

Control logic circuits, sensors, and actuators for the transmission system 10 as disclosed in FIGS. 1 and 2, may be as disclosed in above-mentioned U.S. Pat. Nos. 4,361,060; 4,648,290; 4,930,081 and 4,930,078. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to "blip" the supply of fuel to the engine 14 to achieve rapid synchronous rotation preparatory to a downshift, clutch control via operator 30, and ratio shifting via transmission operator 34. The transmission operator 34 may also be of the "X-Y" type as illustrated in U.S. Pat. Nos. 4,873,881 and 4,899,607, the disclosures of which are incorporated herein by reference.

The central processing unit also sends command output signals to the display 2 to be described in greater detail below. The semi-automatic transmission system 10 may additionally comprises a usual foot operated manual clutch control 3 intended for use only for start from rest and/or low speed creeping maneuvering situations. The control 38 receives signals indicative of manual clutch control 3 position and of actuation of the vehicle brakes 4. The semi-automatic mechanical transmission system 10 also includes sources of electric and/or pneumatic power (not illustrated).

The central processing unit may be of the type illustrated in U.S. Pat. No. 4,595,986 and may incorporate fault detection and tolerance logic of the type illustrated in U.S. Pat. Nos. 4,849,899; 4,899,279 and 4,945,484, the disclosures of which are incorporated by reference.

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Figure 3A:
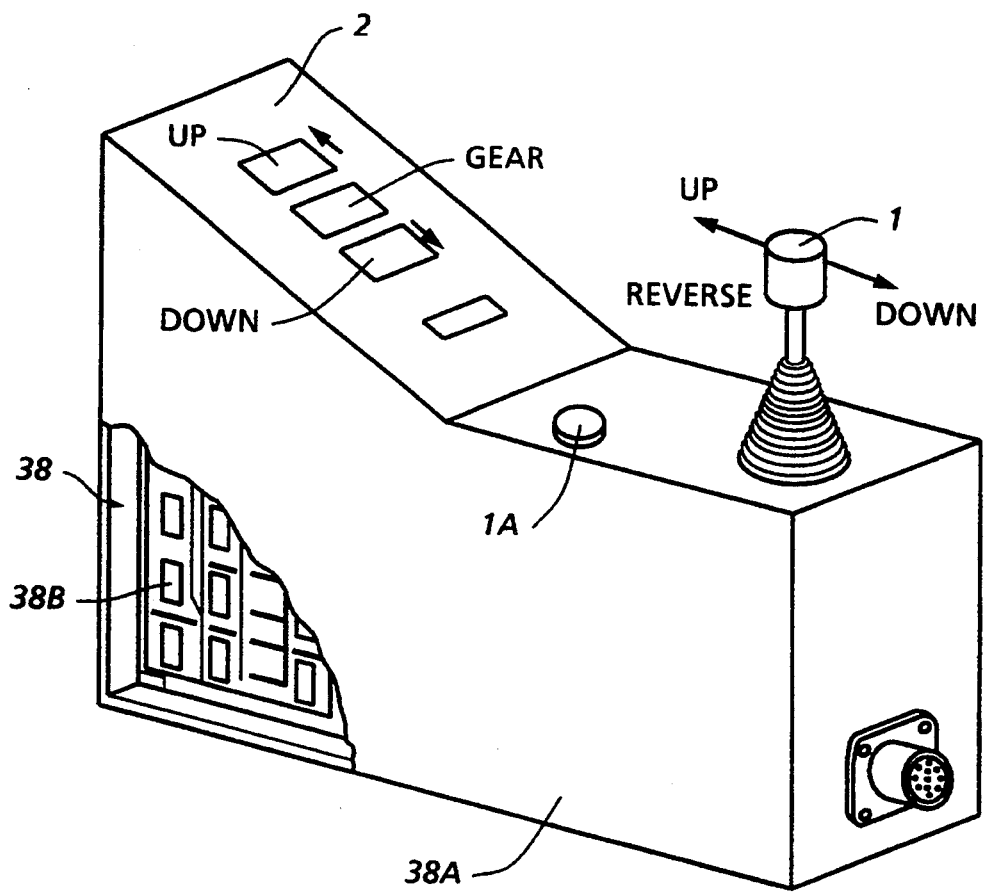
FIG. 3A is a perspective view of the driver's manual shift control and display device.

Preferably, as may be seen by reference to FIG. 3, the central processing unit 38 may be contained in a box or housing 38A, which housing carries the display panel 2 having an upshift indicator display 2', a downshift indicator display 2'', and a currently engaged gear ratio display 2''', the shift select lever 1, an optional reverse enable button 1A, as well as a central processing unit electronic circuitry 38B.

The schematics of the control system of the semi-automatic mechanical transmission system 10 are also illustrated in FIG. 2.

Figure 3B:
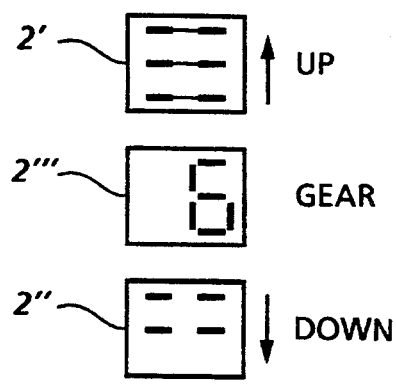
FIG. 3B is an enlarged view of a portion of the display illustrated in FIG. 3A.

Referring to FIG. 3B, the display 2 includes upshift indicator section 2', downshift indicator section 2'' and currently engaged gear ratio indicator section 2'''. As illustrated, the currently engaged gear ratio display section 2''' is presently displaying a "6" indicating that the vehicle transmission is operating in sixth (6th) gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh (7th), eighth (8th) or ninth (9th) speed. The downshift display 2'' section has two lines indicating the maximum number of permissible consecutive downshifts permitted according to the sensed parameters as processed by the predetermined logic or program. In the present situation, the two lines in display 2' indicate that the transmission may be permissibly downshifted to either fifth (5th) or to fourth (4th) gear.

Briefly, the permissibility of a possible upshift or downshift is determined by comparing the expected engine speed at the completion of such an upshift or downshift, assuming a substantially constant vehicle speed or a calculated expected vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3B, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permissible and as to which upshifts and downshifts are impermissible. Should the driver not heed the warning, the central processing unit 38 will not generate impermissible shift command even though synchronization of the mechanical jaw clutch elements could be obtained by the system.

To shift transmission 12, the driver moves lever 1 forward (for upshifts) and rearward (for downshifts) from the position illustrated in FIGS. 2 and 3. To select a single upshift, i.e. a shift to seventh gear, the operator will move lever 1 forward once and the lever will then return to the neutral or centered position under bias. If, in sixth gear as shown, the operator moves the lever forward three times in quick succession, each allowing its return to rest, he will skip two gears in effect, and achieve a skip shift directly into ninth speed (i.e. seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38. The reverse mode of operation may be achieved only from the neutral at rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation.

Upshifts and/or downshifts involving both the main and auxiliary section, i.e. compound shifts, are equally simple for the driver to achieve as are those involving only the auxiliary section, i.e. a split shift. In those transmissions provided with multiple reverse gear ratios, the transmission may be downshifted into lower reverse ratios and upshifted into higher reverse ratios by movement of the control lever backward and forward as indicated. Of course, any type of toggle switch or button which may be located on the end of the shift lever may be utilized in place of reverse enable button 1A.

It is understood that a single control lever moveable forward and backward in a given direction to select a forward and reverse mode of operation, and then moveable in a transverse direction to select upshifts and downshifts either single or multiple, of the type disclosed in U.S. Pat. No. 4,442,730, the disclosure of which is hereby incorporated by reference, may be substituted for the control lever 1 illustrated.

It is another important and advantageous feature of the semi-automatic control system of the present invention that, whenever the vehicle is brought to a stop, by action of the brake, the control will automatically shift transmission 12 to a preselected starting gear, which may involve skip-shifting over a large plurality of intervening gear ratios. By way of example, in a twelve forward speed transmission, the permissible starting ratios may be the first through fifth gear. Once in the start gear range, lever movement in the downshift direction will the shift the transmission one ratio lower and another movement in the upshift direction will shift the transmission one ratio higher. The operator, at rest or in motion, can always select a gear ratio from those permitted. The manual clutch pedal, if utilized, is only intended for use preparatory to stopping to disengage the transmission and avoid stalling and during starting from rest in any of the permissible starting gear ratios.

The preselected start gear may be preset and fixed, may be selectable by the operator, may be determined by the electronic control unit in view of inputs and predetermined logic rules or may simply be the last actually utilized start ratio.

Alternatively, if the operator allows the vehicle ground speed to fall below a reference value (usually at or almost a full stop), and the master clutch 16 is manually or automatically disengaged, a single movement or pulse of lever 1 in the downshift direction from a gear ratio higher than an allowable starting gear will be interpreted as a request for automatic selection and direct engagement of a preselected start ratio, as will a single movement or pulse of lever 1 in the upshift direction from neutral. The range of allowable start gear ratios (usually first through fifth for a twelve speed, first through seventh for an eighteen speed transmission) will vary widely in ratio. For example, in a twelve speed transmission, first gear may have a ratio of 10.899:1 and fifth gear a ratio of 4.271:1 and thus if all automatic shifts into a start gear are initiated at the same vehicle speeds, the target synchronized engine speed might vary from about 1600 RPM for first gear to about 640 RPM for fifth gear.

Figure 4:
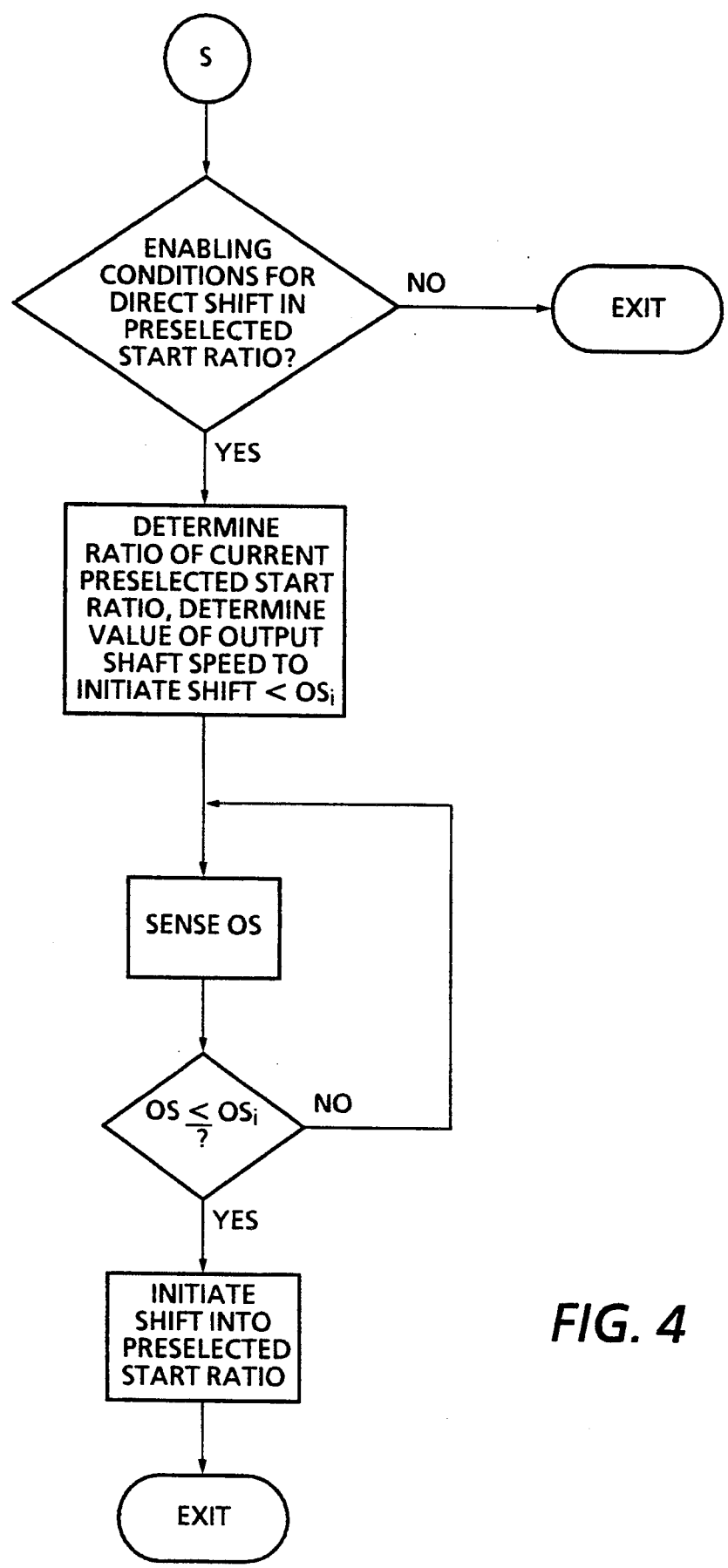
FIG. 4 is a schematic illustration, in the form of a flow chart, of the control system/method of the present invention.

In accordance with the present invention, as illustrated in FIG. 4, the automatic direct shift into the preselected start ratio is initiated by application of the brakes and/or slowing the vehicle to below a predetermined speed and is sequenced as a function of the ratio of the current preselected start ratio, vehicle speed (usually as indicated by output shaft speed) and expected vehicle speed decay during a shift transient into the target start ratio such that at completion of the shift, if the clutch is master clutch is automatically or manually engaged, the engine speed (i.e. the target engine speed for synchronization) will equal a constant predetermined value. Causing the engine to assume a constant and desirable synchronous speed for all selectable preselected start ratios, and reengaging the transmission at a constant and preferred target engine speed, is considered a very desirable enhancement to driver perception of vehicle performance and shift quality.

The control logic is based on the known relationship that, in a known gear ratio (GR) with the master clutch fully engaged, engine speed (ES) and input shaft speed (IS), are related to output shaft speed (OS) by the relationship:

$$ES = IS = OS * GR.$$

Accordingly, the target engine speed to achieve synchronous engagement of a desired gear ratio at a known expected vehicle speed/output shaft speed is easily determined.

Experience has shown that a target engine speed of about 1000 RPM after completion of a shift into the target start ratio for a typical heavy duty truck diesel engine is very desirable to the vehicle operator.

Assuming, for example, a twelve forward speed transmission having selectable start ratios (first through fifth) having numerical ratios of 10.899:1, 8.775:1; 6.818:1; 5.305:1 and 4.271:1 utilized in a truck having a 4.036:1 axle ratio and 506 tire revelations/mile. Assuming also, on the basis of previous experience, that the vehicle speed will decay about three miles per hour 3 MPH) during the shift transient due to braking and/or general retardation.

The reduction in output shaft speed (OS) during a shift can be estimated as:

---

Speed Change Miles/Hr. × Tire Revs/Mile ×
Axle Ratio ÷ 60 = 3 × 506 × 4.036 ÷ 60 =
102 Rev/Min.

Therefore for each start gear, the shift should be initiated at an OS value (OSi), to achieve a synchronized engine speed of
1000 Rev/Min, = (1000 ÷ Gear Ratio) + 102.

For first gear, the OSi value is (1000 ÷ 10.8999) + 102 =
194 Rev/Min.

For fifth gear, the OSi value is (1000 ÷ 4.25) + 102 =
336 Rev/Min.

The OSi values for 2nd, 3rd, 4th gears are calculated accordingly.

The advantage of having separate OSi values for each starting gear is that the target engine speed after the shift can be fine tuned for optimum performance. For example to avoid recycling into 1st gear after changing up into 2nd gear on steep gradients, the value for OSi for 1st and 2nd gear can be set low or even at zero. While constants are used in the example, a more sophisticated system could, of course, use real time readings of actual vehicle deceleration or the like.

The values of OSi for each of the allowable start gear ratios may be maintained in a look-up table portion of the electronic controller and may be customized for each vehicle configuration by means of EPROM devices or the like.

Although the preferred embodiment of the present invention has been described with a certain degree of particularity, various changes to form and detail may be made without departing from the spirit and scope of the invention as hereinafter claimed.

We claim:

1. A method of controlling a semi-automatic mechanical change gear transmission system (10) comprising a manual fuel throttle control (24), a fuel throttle controlled engine (14), a multiple speed change gear mechanical transmission (12) having a lowest grouping of gear ratios (1st–5th) suitable for start from stop operation and having a specific ratio within said lowest grouping of ratios determined to be the predetermined start ratio, a friction master clutch (16) interposed the engine and transmission, a master clutch control (3), a central processing unit (38) for receiving inputs indicative of vehicle speed and for processing same according to predetermined logic rules to issue command output signals to non-manually controlled operators including a fuel throttle control operator (26), and a transmission operator (34), said processing unit sensing conditions indicative of selection of a downshift directly from a higher gear ratio into the predetermined start ratio and for implementing same upon sensing predetermined enabling conditions, said method comprising:
selecting a desired target engine speed, and
sequencing initiation of a direct shift into the preselected start ratio to achieve completion thereof when the product of the numerical gear ratio of the preselected start ratio (GR) multiplied by the expected output shaft rotational speed (OS) is substantially equal to the target engine speed.

2. The method of claim 1 wherein said target engine speed is substantially the same for all selectable preselected start ratios within said lowest grouping of ratios.

3. The method of claim 1 or 2 wherein said sequencing comprises determining an output shaft speed (OSi) at which to initiate a shift into said preselected start ratio as a function of the numerical ratio of said preselected start ratio and the expected decay in vehicle speed during the shift into said preselected start ratio.

4. The method of claims 1 or 2 wherein said input signals include a signal indicative of vehicle braking and said enabling conditions include braking of the vehicle to a vehicle speed less than a reference speed.

5. The method of claim 4 wherein said reference speed is about six miles per hour (6 MPH).

6. The method of claim 3 wherein said input signals include a signal indicative of vehicle braking and said enabling conditions include braking of the vehicle to a vehicle speed less than a reference speed.

7. The method of claim 4 wherein said reference speed is about six miles per hour (6 MPH).

8. The method of claims 1 or 2 wherein said input signal indicative of vehicle speed is a signal corresponding to rotational speed of the transmission output shaft.

9. The method of claim 3 wherein said input signal indicative of vehicle speed is a signal corresponding to rotational speed of the transmission output shaft.

10. The method of claim 4 wherein said input signal indicative of vehicle speed is a signal corresponding to rotational speed of the transmission output shaft.

11. A system for controlling a semi-automatic mechanical change gear transmission system (10) comprising a manual fuel throttle control (24), a fuel throttle controlled engine (14), a multiple speed change gear mechanical transmission (12) having a lowest grouping of gear ratios (1st–5th) suitable for start from stop operation and having a specific ratio within said lowest grouping of ratios determined to be the predetermined start ratio, a friction master clutch (16) interposed the engine and transmission, a master clutch control (3), a central processing unit (38) for receiving inputs indicative of vehicle speed and for processing same according to predetermined logic rules to issue command output signals to non-manually controlled operators including a fuel throttle control operator (26), and a transmission operator (34), said processing unit sensing conditions indicative of selection of a downshift directly from a higher gear ratio into the predetermined start ratio and for implementing same upon sensing predetermined enabling conditions, said system comprising:
means for selecting a desired target engine speed, and
means for sequencing initiation of a direct shift into the preselected start ratio to achieve completion thereof when the product of the numerical gear ratio of the preselected start ratio (GR) multiplied by the expected output shaft rotational speed (OS) is substantially equal to the target engine speed.

12. The system of claim 11 wherein said target engine speed is substantially the same for all selectable preselected start ratios within said lowest grouping of ratios.

13. The system of claim 11 or 12 wherein said sequencing comprises determining an output shaft speed (OSi) at which to initiate a shift into said preselected start ratio as a function of the numerical ratio of said preselected start ratio and the expected decay in vehicle speed during the shift into said preselected start ratio.

14. The system of claims 11 or 12 wherein said input signals include a signal indicative of vehicle braking and said enabling conditions include braking of the vehicle to a vehicle speed less than a reference speed.

15. The system of claim 14 wherein said reference speed is about six miles per hour (6 MPH).

16. The system of claim 13 wherein said input signals include a signal indicative of vehicle braking and said enabling conditions include braking of the vehicle to a vehicle speed less than a reference speed.

17. The system of claim 14 wherein said reference speed is about six miles per hour (6 MPH).

18. The system of claims 11 or 12 wherein said input signal indicative of vehicle speed is a signal corresponding to rotational speed of the transmission output shaft.

19. The system of claim 13 wherein said input signal indicative of vehicle speed is a signal corresponding to rotational speed of the transmission output shaft.

20. The system of claim 14 wherein said input signal indicative of vehicle speed is a signal corresponding to rotational speed of the transmission output shaft.

* * * * *